Jan. 30, 1968

M. HURWITZ 3,366,038

COMBINING APPARATUS

Filed Oct. 22, 1965

INVENTOR
Max Hurwitz
BY
Wolf, Greenfield & Hieken
ATTORNEYS

Jan. 30, 1968 M. HURWITZ 3,366,038
COMBINING APPARATUS

Filed Oct. 22, 1965 3 Sheets-Sheet 2

INVENTOR
Max Hurwitz
BY,
Wolf, Greenfield + Hicken
ATTORNEYS

Jan. 30, 1968   M. HURWITZ   3,366,038
COMBINING APPARATUS

Filed Oct. 22, 1965   3 Sheets-Sheet 3

INVENTOR
Max Hurwitz
BY,
Wolf, Greenfield + Hicken
ATTORNEYS

United States Patent Office 3,366,038
Patented Jan. 30, 1968

3,366,038
COMBINING APPARATUS
Max Hurwitz, Lynn, Mass., assignor to
Maxam Incorporated, Auburn, Maine
Filed Oct. 22, 1965, Ser. No. 501,979
8 Claims. (Cl. 100—93)

ABSTRACT OF THE DISCLOSURE

A combining apparatus is provided for use in the shoe industry for combining a sandwiched layer of a heat-activated adhesive in a laminated construction as in the manufacture of box toes, shoe tips and backers. The apparatus comprises an apparatus frame, a first endless conveyor belt mounted on the frame and a second endless conveyor belt overlying the first belt for movement therewith. A heating platen lies between upper and lower runs of the second belt and means are provided for independently raising and lowering the platen as well as for pivoting the platen, second belt and preferably an upper frame about an axis substantially parallel to the path of goods passing through the apparatus. Thus a portion of the first belt underlying the second belt can be exposed.

---

Various combining constructions are known for heating and applying pressure to a laminate to activate an adhesive. These devices often employ at least one conveyor belt. In the past, problems have arisen due to inadequate guidance of the belts used on drive rollers, excessive heating causing resultant deterioration of the conveyor belts and inadequacy of safety devices.

An important object of this invention is to provide a combining apparatus for laminating a sandwiched layer of heat-activatable adhesive which apparatus facilitates high production speeds with a high degree of safety.

Another object of this invention is to provide an apparatus in accordance with the preceding object which is extremely rugged and durable.

Still another object of the persent invention is to provide an apparatus in accordance with the preceding objects which is not subject to frequent misalignment.

According to the invention, a combining machine has a frame on which is mounted a first or lower endless conveyor belt preferably mounted for rotation in a horizontal plane along a linear path. A second or upper endless conveyor belt, preferably of smaller axial extent than the first conveyor belt, overlies the first belt and is mounted for movement therewith at substantially the same rotational speed along a linear path. The second conveyor belt has an upper and a lower substantially planar run with a heating platen lying between the upper and lower runs. Means are provided for raising and lowering the platen to carry it away from the lower run when raised and into contact with the lower run when lowered to urge the lower run towards the lower belt and to apply heat and pressure through the lower run to stock as the stock is carried between the continuously moving upper and lower belts.

The opposed rollers which carry the upper conveyor belt, and the heating platen are pivotally mounted about an axis substantially parallel to the linear path. The means for pivoting preferably includes an upper support frame for the opposed rollers with one side of the frame being detachably engaged by hold down rods on a side of the machine frame opposite the side on which the pivoting means is mounted. This provision permits changing of the upper belt when desired and provides a safety feature since the upper belt can be raised rapidly if a foreign object or an operator's hand is caught in the machine.

The use of the means for raising and lowering the heating platen is important to prevent undue wear and heat deterioration of the upper belt. Thus, the platen can be engaged with the belt only when stock is being processed in the machine. During the normal warm-up time for the heating platen, it is spaced well above the belt area.

Preferably a series of tack fasteners are linearly arranged on the inner side of the upper belt mating with corresponding grooves in the driving rollers to guide the upper belt and prevent its tendency to slide off the rollers or be misaligned in use.

These and other objects, features and advantages of the invention will be readily understood from the following description when considered in connection with the accompanying drawings, in which:

FIG. 6 is another detail thereof; and

FIG. 7 is a top view of a workpiece processed by the apparatus.

Figure 1:
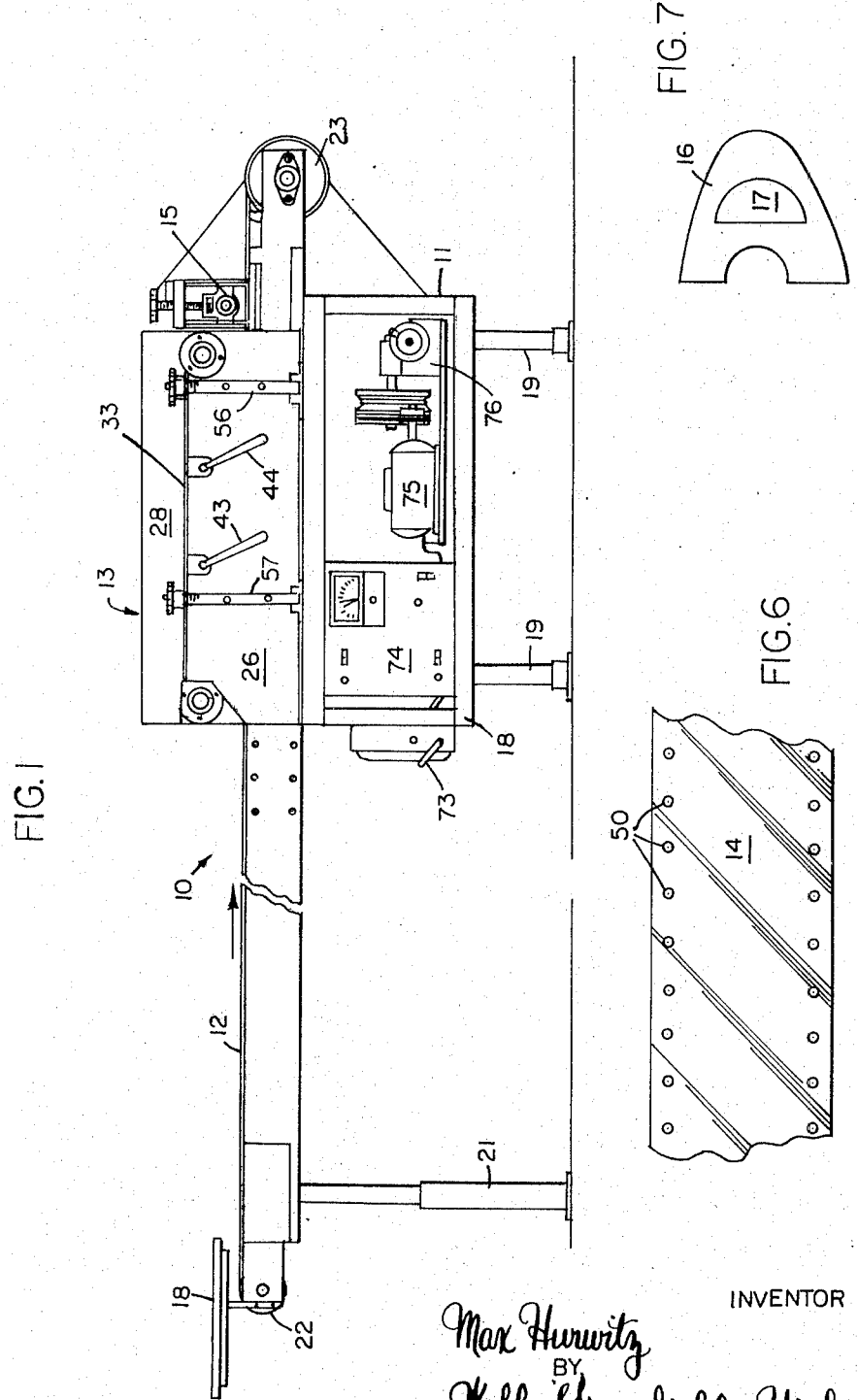
FIG. 1 is a right view of a preferred embodiment of a combining apparatus in accordance with this invention.

Turning now to the drawing and more particularly FIG. 1, a preferred embodiment of the combining machine of this invention is illustrated at 10. The machine 10 has a frame 11, a lower endless conveyor belt 12, a heating zone or chamber 13, an upper endless conveyor belt 14 and a pressure roller 15.

The machine 10 is designed for laminating a sandwiched layer of a heat activatable adhesive to adjacent layers. The workpiece shown in FIG. 7 has a canvas vamp 16, a flat toe patch 17 and a layer of adhesive therebetween. A plurality of vamps can be assembled with their toe patches and stacked on the stand 18 at the front end of the machine. The workpieces are hand fed onto the moving conveyor belt 12 where they are passed into the heated zone to activate the adhesive and then into the pressure roll 15 to press the parts together.

Figure 2:
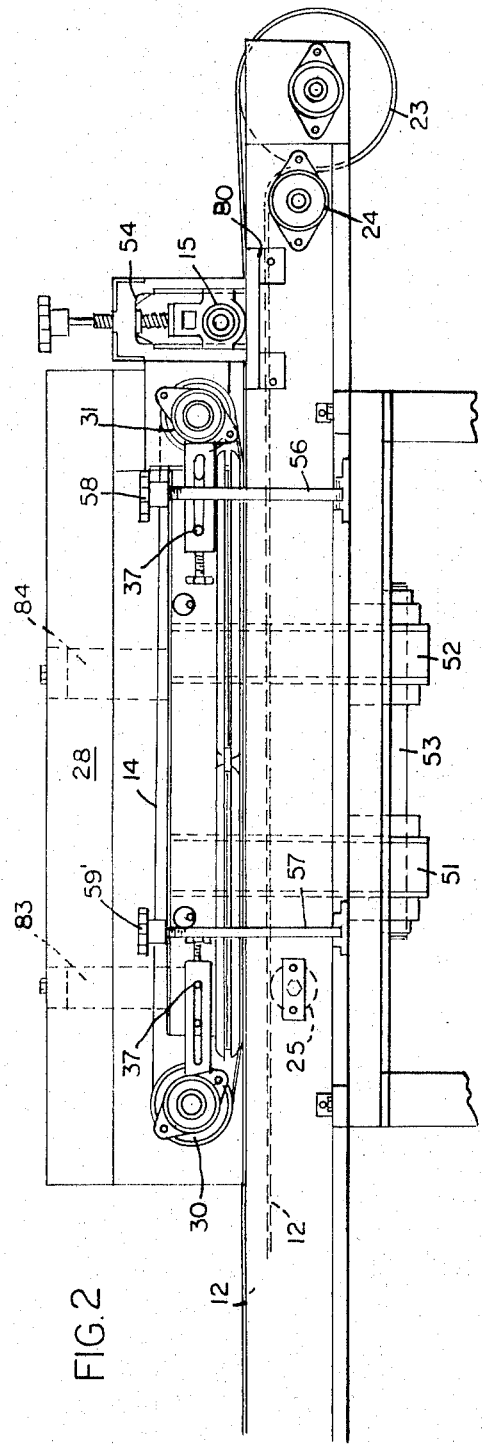
FIG. 2 is an enlarged view of a portion thereof with parts broken away.
Figure 3:
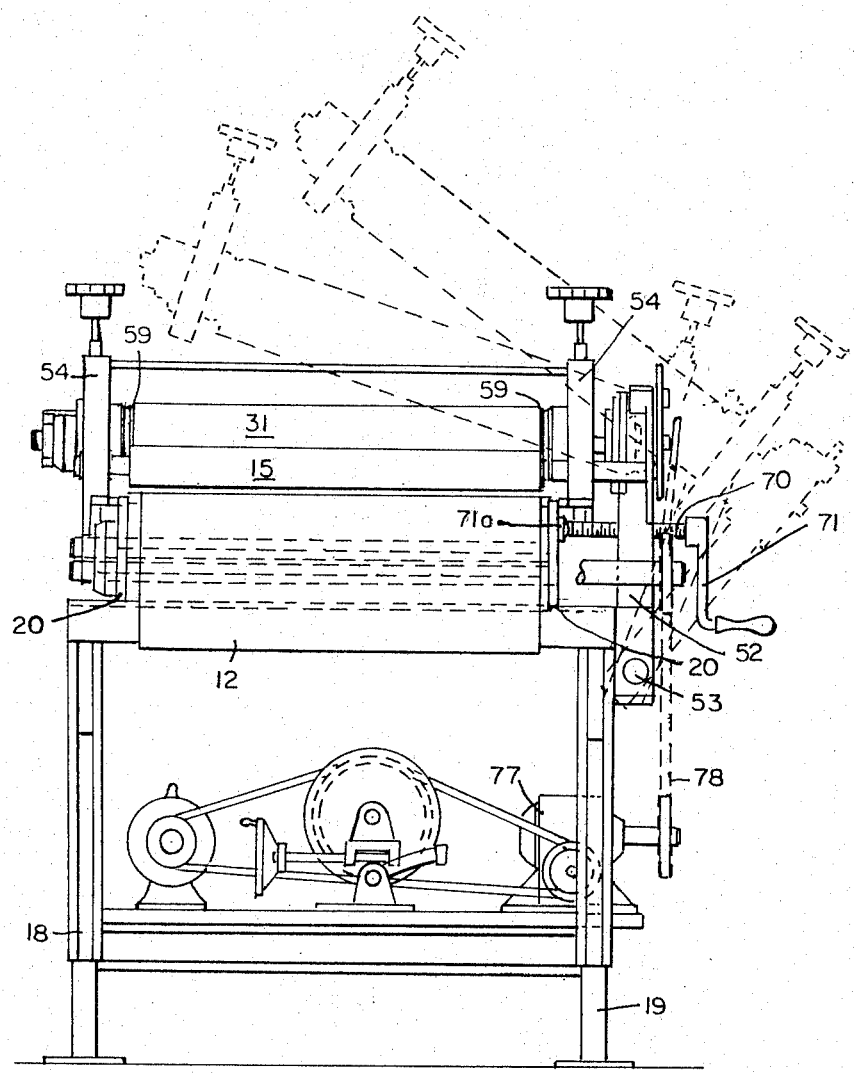
FIG. 3 is a rear view thereof.

The frame 11 preferably comprises a rectangular open box frame 18 constructed of angle irons which are preferably welded together as best shown in FIGS. 1 and 3. Four adjustable legs 19 extend downwardly from the box frame 18. Parallel side rails 20 are provided on either side of the machine having suitable cross braces therebetween with two downwardly depending legs 21 stabilizing the front end of the machine. The rails 20 are preferably fixed to the box frame 18 and carry front and rear endless conveyor belt rollers 22 and 23 respectively extending perpendicular to and between the guide rails 20 mounted on conventional roller bearings. Conventional idler rollers 24 and 25 are provided parallel to rollers 22 and 23 and mounted on bearings located in the side rails 20. Conventional tensioning means may be interconnected with the front or rear rollers 22 and 23 respectively to tighten the lower belt 12. As best seen in FIGS. 1 and 2, the belt 12 is arranged for clockwise horizontal rotation. The lower belt 12 travels in a substantially linear path throughout the length of the machine and supports the work in the apparatus. Preferably the belt is sufficiently sized to provide for combining of a plurality of separate laminations spaced across the width and lentgh of the belt 12.

The heated zone 13 has an insulation lined horseshoe-shaped cover comprising a flat side panel 26 which is preferably pivotably mounted on the top angle iron of the box frame 18. A cover 28 is hingedly attached to the left side of the machine by suitable means such as bars 83 and 84 pivotally mounted on an upper frame 32. A left side panel (not shown) closes the left side of the heated zone.

Figure 4:
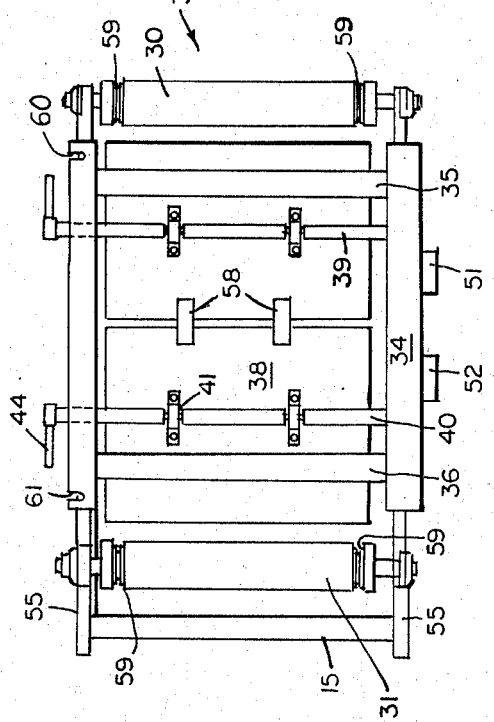
FIG. 4 is a top semidiagrammatic view thereof.

Within the heated zone 13 an upper frame mounts upper belt rollers 30 and 31 parallel to each other and to rollers 22 and 23. The upper frame indicated generally at 32 in FIG. 4 comprises a right side angle iron beam 33 and a left side preferably channel-shaped steel beam 34 extending parallel to each other and preferably with a distance therebetween substantially equal to the distance between rails 20. The elongated side members 33 and 34 are rigidly interconnected with each other preferably through welded struts 35 and 36. Rollers 30 and 31 are mounted in suitable bearings carried by the elongated members 33 and 34 and carry the upper endless conveyor belt 14. Conventional tensioning means 37 are provided at ends of members 33 and 34 to adjust and tighten belt 14.

Figure 5:
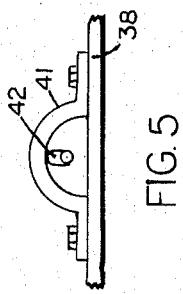
FIG. 5 is a detail thereof.

A two-part heated platen 38 is carried on forward and rear axles 39 and 40 which are journaled in the members 33 and 34 for free rotation about a 360° arc. As best shown in FIG. 5, each platen portion carries two semi-circular brackets mounted on an upper surface thereof through which the axles 39 and 40 pass. The axles 39 and 40 in turn carry cams 42 at portions which pass through the semi-circular brackets 41. Thus, rotation of the axles 39 and 40 automatically causes raising and subsequent lowering of the platen. These axles are actuated by handles 43 and 44 which extend to the right side of the machine out of the side panel 26 as best seen in FIG. 1. Therefore, a user can adjust the height of the platen by handles 43 and 44 during or previous to operation of the machine.

The platen 38 carries suitable conventional electrical heating elements (not shown) for heating to a desired combining temperature which may be in the range of from about 300 to 500° F. in conventional combining operations. The endless belt 14 preferably carries two parallel lines of tacks 50 extending from the inner surface thereof as best shown in FIG. 6. The tacks 50 are in registration with corresponding grooves 59 provided in rollers 30 and 31 to maintain the upper endless conveyor belt 14 in perfect alignment with the lower belt. The lower belt may also contain a series of projecting tacks or other linearly arranged projection means keyed to the rollers 22 and 23. Preferably the upper belt 14 is made of fiber reinforced Teflon or other high heat-resistant material having low friction surfaces. Thus, when the heated platen 38 is lowered into the position shown in FIG. 2, it acts to further tension the belt 14 and provides heat through the upper belt 14 to material passing between the belts.

Rigid links 58 which join the two platen portions can be removed if desired to allow use of only one portion.

A conventional spring tensioned pressure roller 15 along with its associated hold down mounting assemblies 54 is releasably joined to the guide rails 20 on either side of the machine and extends across the belt 12 adjacent the heating zone 13. Each hold down assembly 54 is preferably joined to the upper frame 32 by an extension portion 55 (FIG. 4) of the member 34. Wing threaded lock nuts (not shown) may be used to screw down the hold down assemblies 54 to the rails 20 so that they may be released when the upper frame is to be pivoted about the axle 53.

The upper frame 32 is supported in position by bars 51 and 52 which may be welded to side extensions of the frame at their upper ends and are pivotably mounted on an axle 53 in turn attached to the box frame 18. Preferably the upright rods 51 and 52 are perpendicular to the upper frame members 33 and 34 so that when they are vertically arranged against the edge of the frame as best seen in FIG. 3, the rollers 30 and 31 are horizontal. The frame 32 is further held in position by locking bars 56 and 57. These bars are pivotably mounted on the right side guide rail 20 by shafts parallel to the line of travel of the belt 12 so that they may pivot outwardly from their position shown in FIGS. 2 and 3.

The upper ends of bars 56 and 57 are threaded and carry threaded lock nuts 58 and 59' respectively which permit positioning of the bars 56 and 57 in their upright vertical position passing through notches 60 and 61 (FIG. 4) provided in member 33. On tightening of the lock nuts 58 and 59', the upper frame assembly is positively held in its vertical position. When the upper frame assembly is to be pivoted about the shaft 53, lock nuts 58 and 59' are loosened and swung away from the upper frame to allow pivoting of the upper conveyor belt, upper frame and associated structure. This feature is important to provide for easy replacement of the upper belt when necessary, adjustment of the machine and quick release of any object inadvertently passed between the belts 14 and 12. In addition, opening of bars 56 and 57 permits downward swinging of side panel 26.

While pivoting of the upper frame may be done by hand, preferably a screw shank 70 is journaled in one side of the machine, and fixed at its outer end to crank handle 71 after passing through a threaded portion of bar 52. Upon rotation of the crank handle 71, the entire upper assembly will pivot as shown in FIG. 3. The screw shank 70 is journaled in a conventional pivotable link 71a slidably mounted for substantially vertical movement on the left side member 20.

Suitable electric drive means and a heating source are preferably mounted within the box frame 18. For example, a main power supply switch 73 is interconnected with a control panel 74 for adjusting the temperature of the heated platen. Switches in panel 74 control drive motor 75. The drive motor 75 and controls may be of any conventional type. Preferably the drive motor 75 is interconnected with a clutch and gear mechanism 76 and 77. These mechanisms preferably carry a drive belt (not shown) to drive roller 23 and at least one of rollers 30 and 31. The drive chain for rollers 31 and 23 is preferably a chain drive such as shown at 78 in FIG. 3 interconnected with the rollers by suitable sprockets.

In the operation of the apparatus 10, the main power switch is turned on and electrical current is supplied to the electric resistance heaters within the platen 38. Preferably the handles 43 and 44 are in their raised position permitting heating of the platen 38 while it is spaced at least ¼ inch above the lower run of the upper conveyor belt 14. When the platen has heated to the desired operating temperature, handles 43 and 44 are rotated 180° and the platen lowered into direct contact with the endless belt 14 as shown in FIG. 2. The motor 75 is actuated to drive roller 23 which in turn causes clockwise rotation of the belt 12 and actuates the upper rollers 30 and 31 to cause counterclockwise rotation of belt 14. The belt 14 slides along the flat bottom surface of the heated platen and is heated thereby.

A plurality of vamps 16 are placed on the leading end of belt 12 and toe patches carrying a layer of heat activatable adhesive are placed on top of each vamp. The work pieces proceed along the belt 12 and pass into the heated zone and are pressed between the upper and lower belts and brought to the activation temperature of the adhesive. After passage through the heated zone, the work pieces pass under the rotatable pressure roll 15 which applies a predetermined amount of pressure between the roll surface 15 and a flat plate 80 underlying the belt 12 opposite the pressure roller 15. The laminated work pieces are then passed to the end of the belt where they may be collected by hand or dropped into a suitable collection receptacle.

At any time during the operation of this machine, the platen can be raised out of contact with the upper belt 14 preferably at least ¼ of an inch away from the belt. This prevents unwanted aging of the belt due to the high temperature of platen when the machine is not being used, yet, allows reuse of the machine substantially instantaneously without waiting for the platen to heat up in a subsequent operation. The head or upper assembly can be rotated to expose the area between the upper and lower belt at any time even while the lower belt is operated and the platen is heated.

In a specific example of this invention, belt 12 was 60 inches long, belt 14, 30 inches long and each belt approximately 24 inches wide. At a belt speed of 5 inches per second, employing a temperature in the heated zone of 400° F., approximately 20,000 pairs of vamps could be processed in the machine of this invention in an 8-hour shift with four operators. This production rate is at least 25% greater than normally possible when hand ironing is used for combining shoe vamps as set forth above.

While a specific embodiment of this invention has been shown and described, it should be understood that many variations thereof are possible. Thus, the specific construction of the frame 11, the upper frame 32 and the pressure roll assembly, can vary greatly. In some cases, the pressure roll 15 and its associated assembly need not be connected to the upper frame and can remain in position during pivoting of the upper frame when desired. The specific pivoting means used for pivoting the upper frame as well as the heating chamber casing can vary greatly. Therefore, this invention is to be limited only by the spirit and scope of the appended claims.

What is claimed is:
1. In a combining apparatus for laminating a workpiece having a sandwiched layer of a heat-activatable adhesive, the construction comprising
   an apparatus frame,
   a first endless conveyor belt mounted on said frame,
   a second endless conveyor belt having a shorter length than said first belt overlying said first belt for movement therewith at substantially the same rotational speed along a substantially linear path whereby said workpiece can be fed between said first and second belts,
   said second belt having an upper and a lower substantially planar run,
   a heating platen lying between said upper and lower runs,
   means for raising and lowering said platen independently of said second endless conveyor belt to carry said platen away from said lower run when raised and into contact with said second belt at said lower run when lowered to urge said lower run towards said first belt and apply heat and pressure through said lower run to said workpiece as said workpiece is continuously carried between said first and second belts,
   opposed rollers rotatably mounting said second endless conveyor belt at ends of the upper and lower runs,
   and an upper frame means for mounting said simultaneously pivoting said opposed rollers, said platen and said second conveyor belt about an axis substantially parallel to and to one side of said linear path to expose a portion of said first endless conveyor belt underlying said second endless conveyor belt.

2. An apparatus in accordance with the apparatus of claim 1 wherein said second belt carries at least one longitudinally extending projecting ridge on an inner surface thereof,
   and said rollers each carry a circular recess in registration with said projecting ridge for guiding said second belt during rotation of said rollers.

3. An apparatus in accordance with claim 1 and further comprising a detachable cover means over said second conveyor belt for maintaining a heated zone lying between said upper and lower belts,
   said cover means being mounted for pivotable movement along with said opposed rollers.

4. An apparatus in accordance with claim 1
   and further comprising detachable means for interengaging said upper frame and apparatus frame and securing said upper belt parallel to said lower belt of said apparatus frame.

5. An apparatus in accordance with claim 4 wherein said means for raising and lowering said platen comprises at least one cam means having an actuating handle extending outwardly of said second belt for actuating raising and lowering of said platen,
   and said detachable means comprising a pivotable mounting on a second side of said apparatus frame.

6. An apparatus in accordance with claim 5 and further comprising a detachable cover means enclosing said second conveyor belt for maintaining a heated zone lying between said upper and lower belts.

7. An apparatus in accordance with claim 4 wherein said pivoting means comprises a screw spindle having a central axis and a crank arm for actuating said pivoting movement by rotation of said arm about said central axis,
   and a link mounted on said apparatus frame for receiving said screw spindle.

8. An apparatus in accordance with claim 7 and further comprising a pressure roller positioned on said apparatus frame extending across said first belt for pressing said workpiece after it is heated.

References Cited

UNITED STATES PATENTS

| | | | |
|---|---|---|---|
| 1,053,184 | 2/1913 | Kern | 100—152 X |
| 2,071,999 | 2/1937 | Dike | 100—93 X |
| 2,297,295 | 9/1942 | Flintzer. | |
| 2,451,728 | 10/1948 | Gardner et al. | 100—93 |
| 3,229,620 | 1/1966 | Rogers et al. | 100—93 |
| 3,257,257 | 6/1966 | Karsten et al. | 100—93 X |

LOUIS O. MAASSEL, *Primary Examiner.*